(12) United States Patent
Kudligi Anantha et al.

(10) Patent No.: US 12,315,505 B2
(45) Date of Patent: May 27, 2025

(54) METHODS AND SYSTEMS FOR PROVIDING INSIGHTS IN REAL-TIME DURING A CONVERSATION

(71) Applicant: Clari Inc., Sunnyvale, CA (US)

(72) Inventors: Harsha Kudligi Anantha, Pleasanton, CA (US); Subodh Kishorilal Sah, Santa Clara, CA (US); Rashmi Shekar, San Francisco, CA (US); Shailesh Patil, Lathrop, CA (US); Shreyas Shankar, Campbell, CA (US); Kyle Buza, Minneapolis, MN (US); Jayanth Mohana Krishna, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 345 days.

(21) Appl. No.: 17/823,380

(22) Filed: Aug. 30, 2022

(65) Prior Publication Data

US 2024/0071380 A1    Feb. 29, 2024

(51) Int. Cl.
*G10L 15/22*    (2006.01)
*G10L 15/18*    (2013.01)
*G10L 15/30*    (2013.01)

(52) U.S. Cl.
CPC .......... *G10L 15/22* (2013.01); *G10L 15/1815* (2013.01); *G10L 15/30* (2013.01); *G10L 2015/228* (2013.01)

(58) Field of Classification Search
USPC ..................................................... 704/1–504
See application file for complete search history.

(56) References Cited

U.S. PATENT DOCUMENTS

| | | | |
|---|---|---|---|
| 8,200,494 B2 * | 6/2012 | Bezar | G10L 17/26 704/206 |
| 9,338,493 B2 * | 5/2016 | Van Os | G10L 15/22 |
| 10,446,143 B2 * | 10/2019 | Akbacak | G06F 40/166 |
| 10,558,421 B2 * | 2/2020 | Abuelsaad | H04M 3/569 |
| 11,664,029 B2 * | 5/2023 | Engelke | G10L 15/26 704/251 |
| 12,062,368 B1 * | 8/2024 | Arora | G10L 15/063 |
| 2004/0093218 A1 * | 5/2004 | Bezar | G10L 17/26 704/E17.002 |
| 2011/0066436 A1 * | 3/2011 | Bezar | G10L 17/26 704/E15.001 |

(Continued)

*Primary Examiner* — Marcus T Riley
(74) *Attorney, Agent, or Firm* — WOMBLE BOND DICKINSON (US) LLP

(57) ABSTRACT

The disclosure describes systems, methods, and media for generating real-time insights in a voice over internet protocol (VoIP) conversation. According to the methods, an application server receives a transcript of one or more voice utterances of a participant in the VoIP conversation, and identifies a context of the VoIP conversation and a first state of the context based on the transcript. The application server further receives an intent of the participant from a conversation artificial intelligence (AI) engine based on the transcript provided to the conversation AI engine. The application server further formulates one or more queries based on the intent, the context, and the first state of the context to retrieve one or more insights from one or more backend databases, and transmits the one or more insights to a terminal of at least one participants of the VoIP conversation for display.

20 Claims, 8 Drawing Sheets

(56) References Cited

U.S. PATENT DOCUMENTS

| | | | |
|---|---|---|---|
| 2012/0262296 A1* | 10/2012 | Bezar ..................... | G10L 25/63 704/200 |
| 2015/0170638 A1* | 6/2015 | Bezar ..................... | G10L 17/26 704/246 |
| 2018/0336001 A1* | 11/2018 | Abuelsaad ............. | G10L 17/22 |
| 2024/0071380 A1* | 2/2024 | Kudligi Anantha ... | G06Q 10/10 |

* cited by examiner

METHODS AND SYSTEMS FOR PROVIDING INSIGHTS IN REAL-TIME DURING A CONVERSATION

TECHNICAL FIELD

Embodiments of the present invention relate generally to voice over internet protocol (VoIP). More particularly, embodiments of the invention relate to obtaining real-time insights based on conversation context changes during a VoIP conversation.

BACKGROUND

VoIP calls are becoming increasingly common these days during internal and external sales calls. During either type of sales calls, participants may need real-time insights (e.g., relevant information or talking points) to make the calls more productive.

For example, in an internal sales call with five participants and where multiple different accounts need to be discussed, some participants may need to live share their screens to show statistics for the different accounts. As another example, in a VoIP call between a sales representative and a customer, the sales representative may need to state the pros and cons of his products in real time for comparison whenever the name of a competitor is mentioned.

Existing VoIP applications do not have the features to provide real-time insights. Thus, it would be beneficial for sales teams to have a VoIP application with such features to better engage existing or potential customers and/or move the sales calls forward faster.

BRIEF DESCRIPTION OF THE DRAWINGS

Embodiments of the invention are illustrated by way of example and are not limited to the figures of the accompanying drawings, in which like references indicate similar elements.

DETAILED DESCRIPTION

Figure 1:
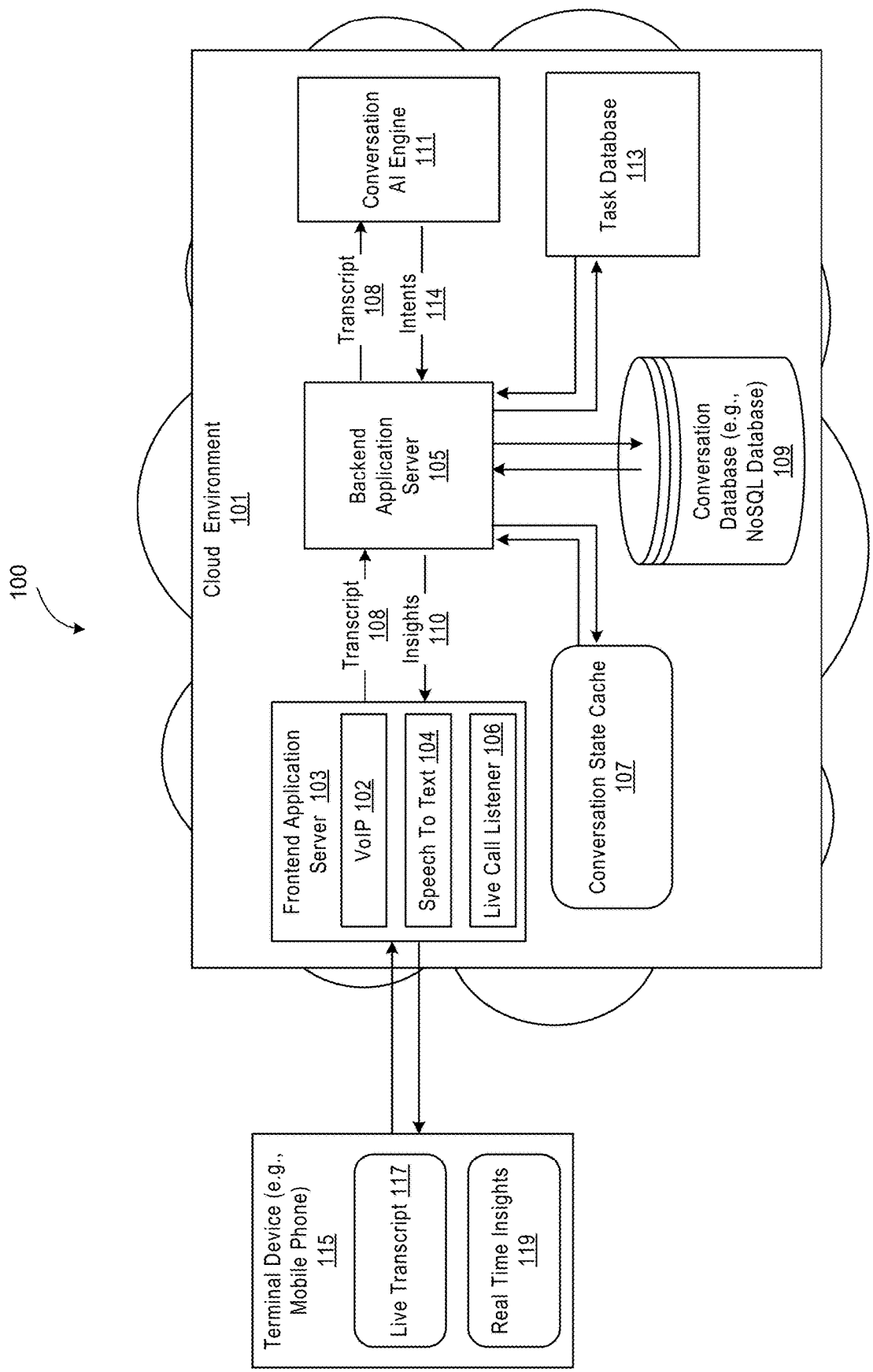
FIG. 1 is a schematic diagram illustrating a system for generating real-time insights during a VoIP conversation according to an embodiment of the invention.

Various embodiments and aspects of the inventions will be described with reference to the details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" or "in an embodiment" in various places in the specification do not necessarily all refer to the same embodiment.

The disclosure describes systems, methods, and media for generating real-time insights in a voice over internet protocol (VoIP) conversation. The insights can function as cues to remind a participant of proper things to say in response to a question of another participant in the VoIP conversation, or provide additional information regarding a particular matter raised in the VoIP conversation. According to a method in an embodiment, an application server receives a transcript of one or more voice utterances of a participant in the VoIP conversation, and identifies a context of the VoIP conversation and a first state of the context based on the transcript. The application server further receives an intent of the participant from a conversation artificial intelligence (AI) engine, which identifies the intent based on the transcript provided to the conversation AI engine. The application server further formulates one or more queries based on the intent, the context, and the first state of the context to retrieve one or more insights from one or more backend databases, and transmits the one or more insights to a terminal of at least one participant in the VoIP conversation for display.

In an embodiment, each of the one or more participants is a participant with one or more predetermined attributes, for example, an internal employee of the company that owns the backend application server. The one or more insights are not displayed on a terminal device of at least one participant in the VoIP conversation, and at least one participant has one or more predetermined attributes that one or more participants do not have. For example, a customer, who is not an employee of the company that owns the backend application server typically will not see one or more insights due to data privacy and security.

In an embodiment, the context of the VoIP conversation is a data object that defines one or more of the following properties: participants of the VoIP conversation, a period that the VoIP conversation relates to, whether the participants include an external party, contact information of the external party, activities between the participants, whether a competitor is mentioned, or deal information among the participants. One or more additional properties can be added to the data object based on the one or more void utterances.

In an embodiment, the first state of the context is changed to a second state when each of the one or more additional properties is added to the data object or when a value of an existing property changes. The context of the VoIP conversation, a unique identifier of the VoIP conversation, and the first state and the second state of the context of the VoIP conversation are stored in a cache in a cloud environment, and the cache further includes a state machine that keeps tracks of each state of the context during the VoIP conversation. The intent generated by the conversation AI engine is further refined based on the state machine.

In an embodiment, the backend application server formulates one or more queries based on the intent, the context, and the state of the context to retrieve the one or more insights from one or more backend databases in the cloud environment. Backend databases include a task database and a conversation database, wherein the task database includes information related to a plurality of tasks, and wherein the conversation database includes a plurality of entries, each entry mapping an insight to a combination of a context, a state of the context, and an intent.

The other embodiments, functions and advantages will be apparent from the accompanying drawings and from the detailed description that follows.

FIG. 1 is a schematic diagram illustrating a system 100 for generating real-time insights during a VoIP conversation according to an embodiment of the invention. As shown in FIG. 1, the system 100 includes one or more terminal devices, such as mobile phones, laptop computers, etc., and servers and databases residing in the cloud and/or on-premises environment. This embodiment uses one terminal device 115, and servers and databases residing in a cloud environment 101 for the purpose of illustration.

The cloud environment 101 can include a frontend application server 103, a backend application server 105, a conversation artificial intelligence (AI) engine 111, a conversation state cache 107, a conversation database 109, and a task database 113.

The frontend application server 103 can include a number of services, such as a VoIP service 102, a speech to text service 104, and a live call listener service 106. The VoIP service 102 converts voice utterances of a user of the terminal device 115 into a digital signal that travels across the internet, allowing the user to make a call directly from the terminal device 115. The speech to text service 102 can be a speech recognition service that converts the voice utterances/or speech of the user of the terminal device 115 into transcripts. The live call listener service 106 allows a third party to listen to a live call managed by the frontend application server 104 without the knowledge of either party on the call.

The backend application 105 can receive a transcript 108 generated by the frontend application server 103, and provide the transcript 108 as input to the conversation AI engine 111, and receive intents 114 generated by the conversation AI engine 111.

In an embodiment, the conversation AI engine 111 can be a natural language processing (NLP) engine that combines computational linguistics (i.e., rule-based modeling of human language) with statistical, machine learning, and deep learning models to understand the meaning of human language, including the intent of the speaker. The conversation AI engine 111 can include a number of components for extracting linguistic features of the transcript 108, such as the basic grammar rules, word organizations, and relations between words. The number of components can include a machine learning model for inferring the meaning of each sentence in the transcript 108, and an intent classifier for identifying one or more intents of each sentence in the transcripts 108. The intent classifier can be a rule-based pattern matching algorithm, or a deep learning model (e.g., an artificial neural network).

In an embodiment, an intent can be a text expression indicating the intention of the speaker when uttering a sentence. For example, if the transcript 108 is "I would like to book a flight from San Francisco to New York City," the conversation AI engine 114 would analyze the sentence to infer its meaning, and then classify the sequence of words under the label "book flight". In this case, the text "book flight" is an intent of the speaker.

In an embodiment, the conversation AI engine 111 can generate multiple intents for a transcript. In such a case, the conversation AI engine 111 would rank the multiple intents based on a number of factors, such as how frequently each intent appears historically. A more frequently appearing intent is ranked higher than a less frequently appearing intent if all the other ranking factors are the same. The highest ranked intent will be selected as the intent of the sentence by the conversation AI engine 111.

The conversation state cache 107 can store each VoIP conversation along with a context of the VoIP conversation and an identifier that uniquely identifies the VoIP conversation. The context of the VoIP conversation can be a data object, for example, a JavaScript Object Notation (JSON) object, and can include one or more of the following properties: participants of the VoIP conversation, a period of time that the VoIP conversation relates to, whether the participants include an external party, contact information of the external party, activities between the participants, whether a competitor is mentioned, or deal information among the participants. The properties in each context can be deleted or added, and the value of each property can be also updated. Each change in a value of a property or each property addition or deletion can change the state of the context. The conversation state cache 107 also keeps track of the state changes in the context of each VoIP conversation.

In an embodiment, a state change can be caused by a conversation participant raising a new topic, mentioning a new competitor in a new voice utterance during a VoIP conversation. Multiple voice utterances can include the same intent. Thus, one state change can correspond to multiple transcripts, each of which can correspond to one or more intents.

The conversation database 109 can be a NoSQL database that stores entries that each map a state of a context of a VoIP conversation and a corresponding intent to an insight. Thus, given a state of a context and an intent associated with the context state, an insight corresponding to the state and the intent can be retrieved from the conversation database 109.

In an embodiment, the insights in the conversation database 109 can be derived from historical data, including activity data and account data. The derivation of insights is described in detail in FIG. 2.

The task database 113 can be a customer relationship management (CRM) system, and can store information about deals. Examples of the deal information include potential value of the deal, a stage of the deal (e.g., "commit" or "completed"), contact persons, and their contact information. The contact persons of a deal can include one or more source contact persons (e.g., sales representatives) and one or more target contact persons (e.g., customer contact persons).

When receiving a transcript from the frontend application server 103, the backend application server 105 can determine a context based on the participants of the VoIP conversation, and information associated with the participants that is retrieved from the task database 113.

By default, each context has a default state. The default state can be changed by an addition or a deletion of a property, or by a change in a value of an existing property. The backend application server 105 can formulate one or more queries based on the intent generated by the conversation engine 111, a context of a VoIP conversation, and a state of the context, and can intelligently determine which database to query.

For example, in one embodiment, if the intent concerns a simple retrieval of information, such as contact information of target contacts, the backend application server 105 can query the task database 113; otherwise, the backend application server 105 can query the conversation database 109. In another embodiment, the backend application server 105 will query both the task database 113 and the conversation database 109.

Figure 2:
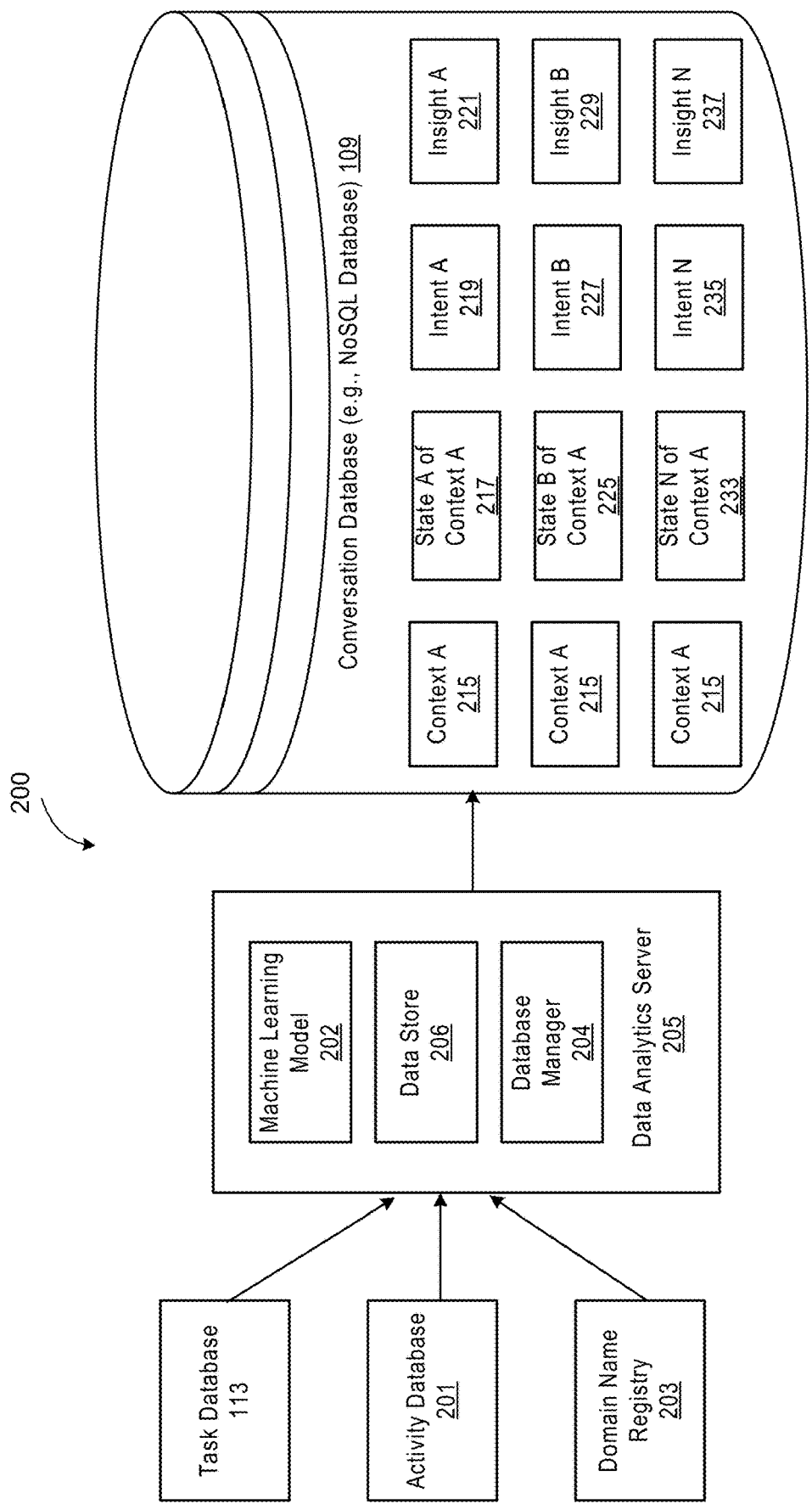
FIG. 2 illustrates a system for populating the conversation database according to an embodiment of the invention.

FIG. 2 illustrates a system 200 for populating the conversation database 109 according to an embodiment of the invention. As shown in FIG. 2, the system 200 can include a data analytics server 205 for retrieving data from a number of data sources, such as the task database 113, an activity database 201, and a domain name registry 203. The system 200 can use a machine learning model 202 to identify insights from the retrieved data, and populate the conversation database 109 with the identified insights.

The activity database 201 can include activity data such as historical email communications, meetings and transcripts of phone calls (i.e., conversations), and persons who conducted the activity (i.e., participants of the activity). A database manager 204 running on the data analytics server 205 can provide one or more services to initiate or schedule processing threads to synchronize data between the activity database 201 and the task database system 113, such that each task/deal in the task database system 113 can have updated activity information for that task. The synchronization can be performed automatically and periodically using multiple processing threads. Through a first processing thread executed by a processor, the database manager 204 can access the activity database 201 via an application programming interface (API) over a network to retrieve a list of event objects that are associated with a number of activities in the activity database 201.

Through a second processing thread, the database manager 204 can determine one or more participant identifiers (IDs) from each of the event objects. The participant IDs identify one or more participants in an event or activity associated with the event object. The database manager 204 can extract a domain ID from each participant ID. Alternatively, the database manager 204 can obtain the domain ID for each participant by searching a data structure or database, or through a third party such as a domain registry server 203. The database manager 204 can identify one or more entity objects based on the domain ID, where the entity objects (e.g., an account object) are stored in the task database 113.

In an embodiment, at least one attribute of at least one of the entity objects is modified based on the participant ID and the domain ID. The modification can generate at least one modified entity object. The database manager 204 can use a third processing thread to transmit one or more modified event objects to the task database 113 via a second API over the network. The first processing thread, the second processing thread, and the third processing thread can be executed independently.

In one embodiment, in modifying at least one attribute of at least one entity object, the database manager can determine whether there are multiple entity objects associated with the same domain ID. If there are, the database manager 204 can select a first entity object from the multiple entity objects based on a set of rules, and modify one or more attributes of the selected entity object based on the participant ID and the domain ID.

If the database manager 204 determines that a participant ID matches a creator ID or owner ID corresponding to a creator or owner of any of the entity objects, the database manager 204 can select the first entity object for modification if the first entity object is the only entity object whose creator ID matches the participant ID. Otherwise, if the first entity object is not the only matching entity object, the database manager 204 can designate the multiple entity objects as entity object candidates.

In addition, for each of the entity objects, the database manager 204 can determine whether one or more task objects are associated with the entity object. Each task object is associated with a task to be completed within a predetermined period of time. For each of the task objects, the database manager 204 can determine whether a participant ID matches a user ID of any user of a user group associated with the task object. If so, at least one attribute of the task object is modified based on the participant ID.

In an embodiment, a data store 206 can be provided in the data analytics server 205 for use to store or cache data for a variety of tasks or activities, which may be periodically updated from the corresponding data source(s) or data provider(s), in this example, database systems 113 and 201.

The machine learning model 202 can use a set of predetermined rules to identify insights from the task data and the activity data. As discussed above, each task can be in one of a number of stages. The machine learning model 202 can examine activity data corresponding to each stage of the task, and determines which type of activity might have contributed to the progression of the task from one stage to the next stage, and identify a particular email or a particular phone call as insights.

For example, the machine learning model 202 can examine activity data of two similar tasks. If task A moves from one stage to a next stage while task B does not, and the only difference between the two tasks is that the sales representative for task A addresses the customer with "You" frequently when requesting an in-person meeting while the sales representative for task B rarely address the customer directly, then the machine learning model can identify "directly addressing customers with 'You'" as an insight.

For each identified insight, the machine learning model 202 can also identify a context, a state of the context, and an intent of the person associated with the activity. In the above example, the context would be a communication between a sales representative and a customer, the state of the context would be a default state, and the intent of the sales representative would be to request an in-person meeting.

The conversation database 109 can be populated with all insights identified from the task data and the activity data an insight, and intents, contexts, and context states that correspond to the insights.

As shown in FIG. 2, the conversation database 109 includes three insights 221, 229, and 237 for a context A 215 that respectively correspond to context states 217, 225, and 244, and intents 219, 227 and 235. The three entries are provided for the purpose of illustration. In actual implementations, the conversation database 109 can include as many insights as identified by the machine learning model 202 from the data sources 113, 201, and 203.

Figure 3:
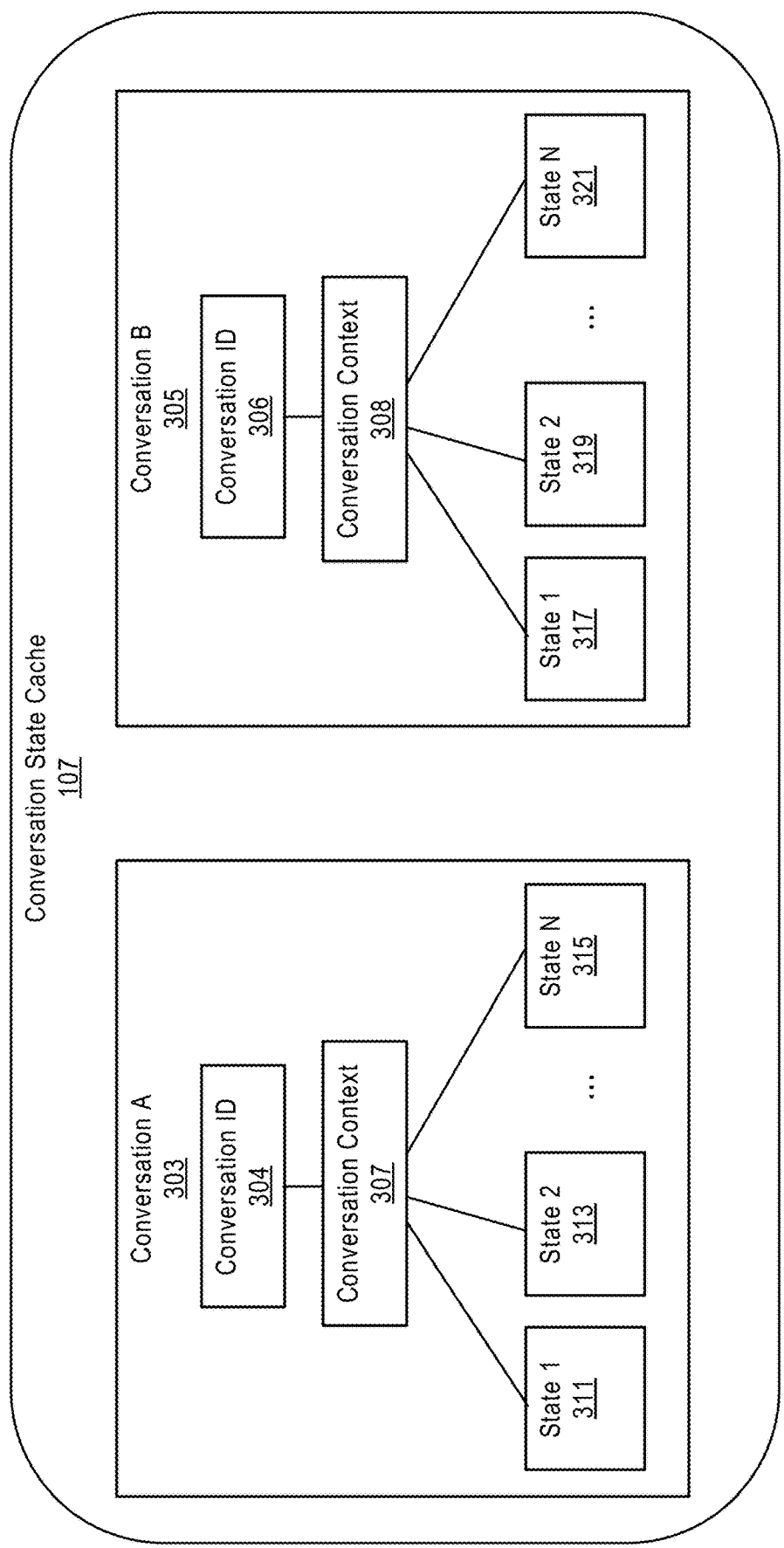
FIG. 3 illustrates an example of the conversation state cache according to an embodiment of the invention.

FIG. 3 illustrates an example of the conversation state cache 107 according to an embodiment of the invention. The conversation state cache 107 can store conversation contexts and all of their states. During a VoIP conversation, the backend application server 105 stores each context identified and each state of the context to the conversation state cache 107, and also retrieves the context and its associated states during the conversation for use in identifying insights.

In an embodiment, the conversation state cache 107 can store a name-value pair for each conversation. The name can be a unique ID for a particular conversation, and the value can be the context of the conversation.

As shown in FIG. 3, a context 307 for conversation A 303 and another context for conversation B 305 are stored in the conversation state cache 107, and each context is associated with a unique identifier 304 and 306. Further, states 311, 313, and 315 for the context 307 and states 317, 319, and 321 for the context 308 are stored in the conversation state cache 107.

The state information for each conversation constitutes a state machine that keeps track of all states of the context of a VoIP conversation, e.g., what is being asked previously in the conversation. The state machine enables the backend application server 105 to identify an intent of the person more accurately.

For example, if a current state is associated with an utterance of "contact information", this utterance alone is insufficient for the backend application server 105 to determine the intent of the speaker. However, if one or more earlier states in the state machine is associated with "a customer", then the combination of the current state and the one or more earlier states would be sufficient to identify the intent of the participant in the VoIP conversation as requesting customer contact information.

Thus, in an embodiment, an intent generated by the conversation AI engine 111 can be refined based on one or more states in the state machine stored in the conversation states cache 107.

Figure 4:
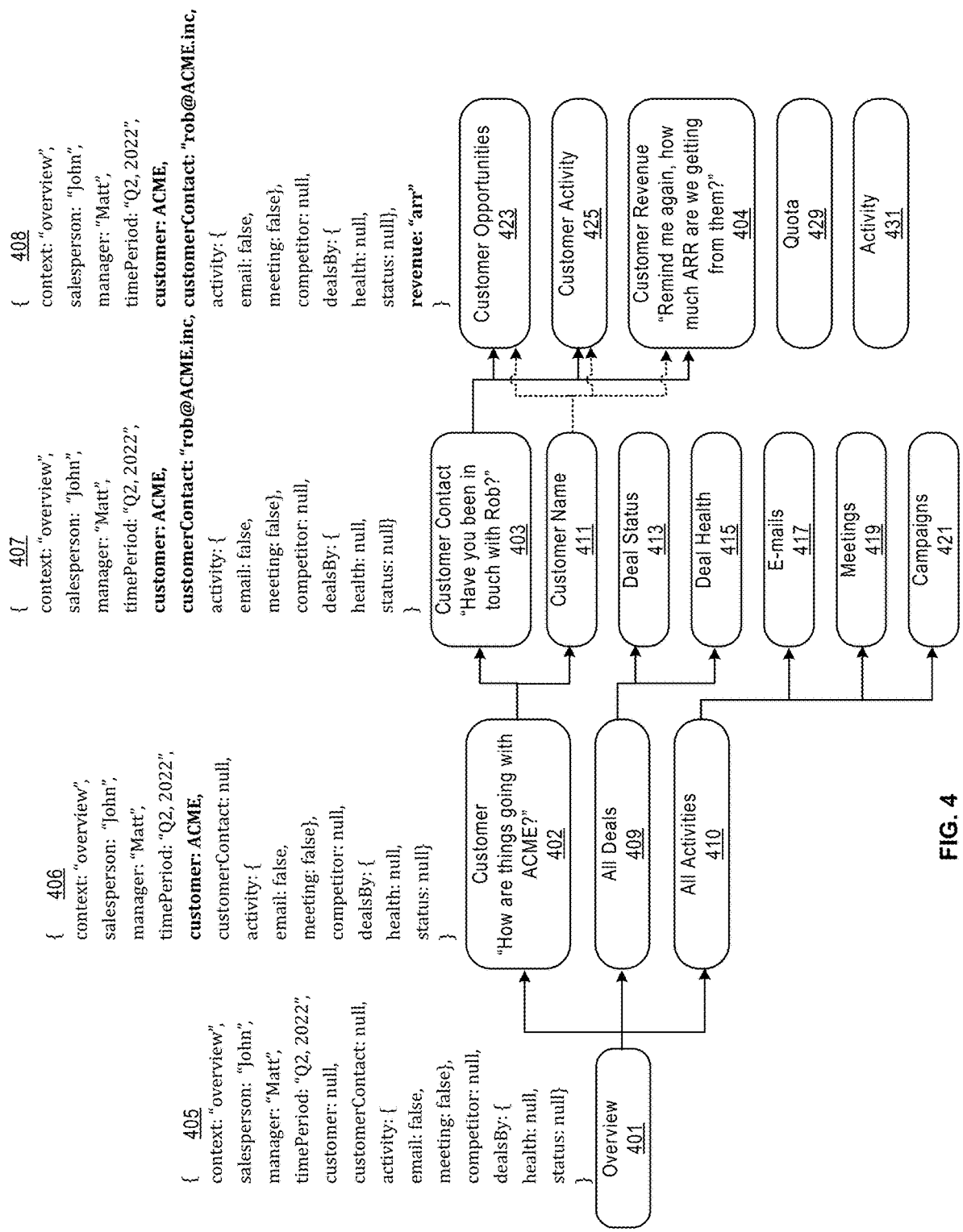
FIG. 4 is a flow diagram illustrating an example use case of generating real-time insights based on voice utterances of a participant in a VoIP conversation according to an embodiment of the invention.

FIG. 4 is a flow diagram illustrating an example use case of generating real-time insights based on voice utterances of a participant in a VoIP conversation according to an embodiment of the invention. This diagram focuses on particular use case among multiple possible use cases. More specifically, this diagram focuses on a use case defined by the path that includes blocks 401, 402, 403, and 404, with the block 401 representing the beginning of the conversation, and each of the other blocks representing a step where one of the participants makes a meaningful voice utterance.

The path 401, 402, 403, and 404 represents a VoIP conversation between a salesperson "John" and his manager "Matt", and this VoIP conversation can have a context "overview" created by the backend application server 105 when the VoIP conversation is established. The context is in a default state 405 at the block 401, and can change to different states 406, 407, and 408 as either the value of its property changes or a new property is added. Each state change may have an insight generated by the system 100 and sent to John and Matt on their respective terminals for display.

For example, after the conversation starts, Matt asks John "How are things going with ACME?" This voice utterance by Matt can be converted into a transcript, which can be provided to the conversation AI engine 111. The conversation AI engine 111 can identify the intent of Matt as wanting to know if there are any issues and/or progress with ACME. This intent can be further refined based on historical states of the context reflecting what has been previously discussed in this conversation. The backend application server 105 can construct one or more queries from the refined intent and the context state 404, and run the one or more queries against the conversation database 109 and/or the task database 113 to retrieve one or more insights.

For example, one of the queries may retrieve from the task database 113 all tasks/deals whose stages have changed, and send the stage change information, including the names of the tasks, to the terminal device of John and Matt. Another query may retrieve another insight from the conversation database 109 if there is an entry that matches the context state, the context, and the intent.

In an embodiment, it may happen that none of the queries may retrieve anything from either database. When that happens, no insight will be displayed on the terminal devices of John and Matt.

At the block 403, the context state changes again when Matt, the manager, asked the question, "Have you been in touch with Rob?" In this case, the backend application 105 may go through the above process described with the block 403, and formulate one or more queries to retrieve insights from the task database 113 and/or the conversation database 109. Examples of the insights include information indicating that Rob is a customer contact; his email address; and that there are email exchanges between John and Rob.

At the block 404, insights may similarly be retrieved from the task database 113 and/or the conversation database 109. Examples of the insights include information indicating the total amount of annual recurring revenue (ARR) from AMCE.

In an embodiment, the VoIP conversation between John and Matt that starts at the block 401 may also take other paths involving other blocks 409-431. The other paths (use cases) are not described herein detail.

Figure 5:
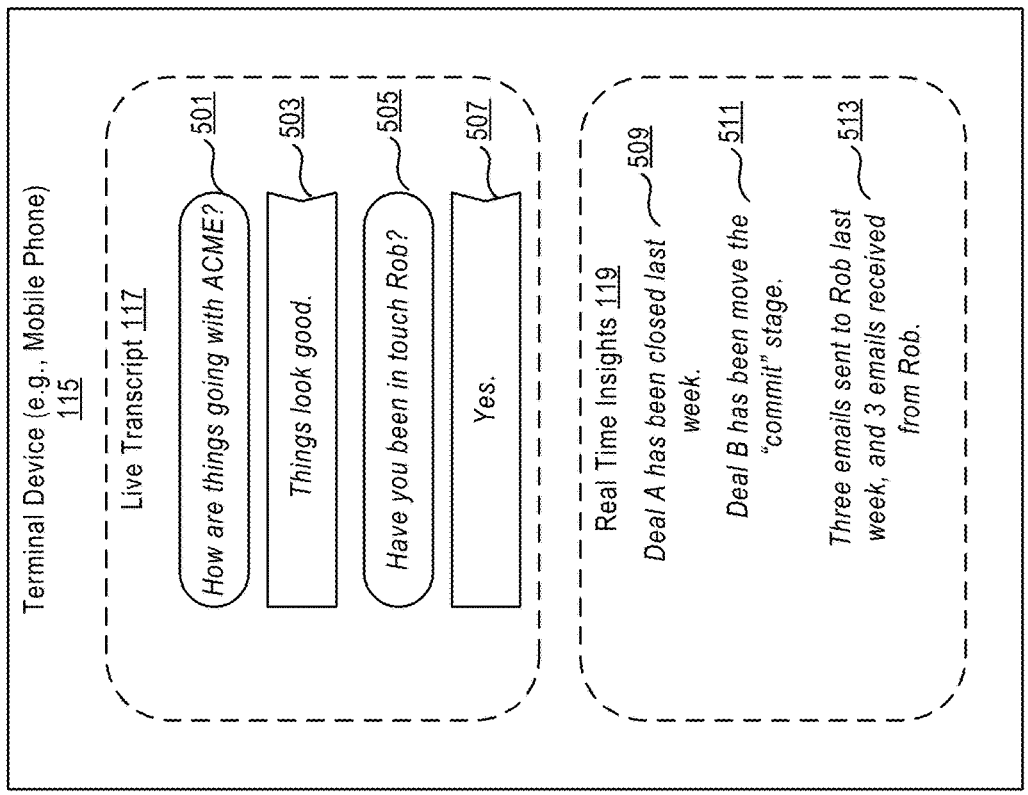
FIG. 5 illustrates an interface of a VoIP application in which both a live transcript of a VoIP conversation and related insights are displayed according to an embodiment of the invention.

FIG. 5 illustrates an interface of a VoIP application in which both a live transcript of a VoIP conversation and related insights are displayed according to an embodiment of the invention. In this figure, sentences 501 and 505 in the box for the live transcript 117 are translated from voice utterances of one party/participant (e.g., a sales manager) of the VoIP conversation, and sentences 503 and 507 are translated from voice utterances of another participant (e.g., a sales representative).

In the box for real-time insights 119, messages 509 and 511 are related to the sentence 501, and message 513 is related to the sentence 505. The insights are displayed in real-time while the VoIP conversation is on-going. In an embodiment, the insights can provide cues for a call participant to answer a question asked by another participant, or can provide additional information so that all participants are on the same page regarding a particular matter.

Figure 6:
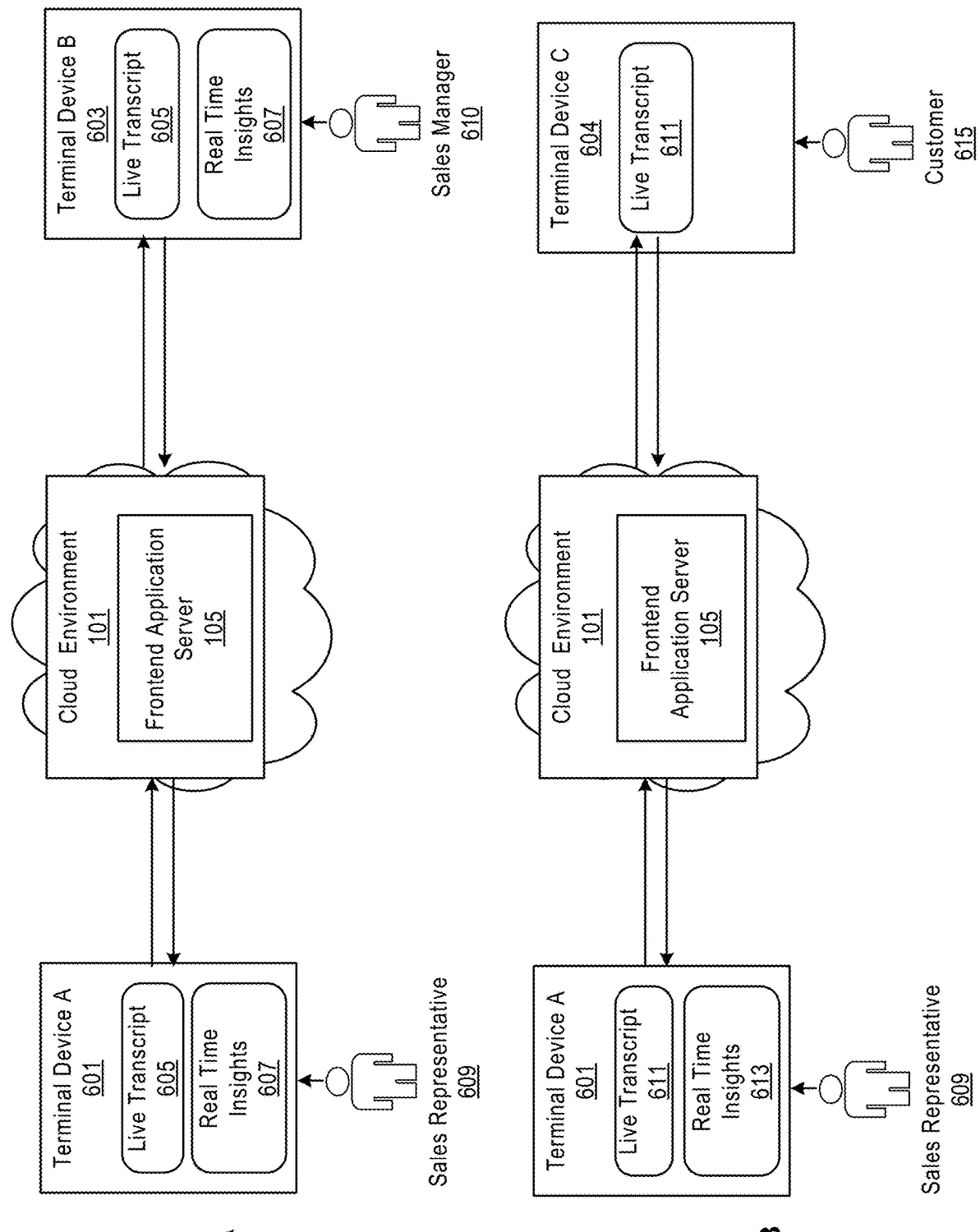
FIGS. 6A and 6B illustrate two different VoIP conversations with different participants according to different embodiments of the invention.

FIGS. 6A and 6B illustrate two different VoIP conversations with different participants according to different embodiments of the invention. In FIG. 6A, one participant is a sales representative 609, and the other party is a sales manager 601. Since both parties are employees of the same company, real-time insights 607 are displayed to terminal devices 601 and 603 of both participants, along with a live transcript 605 of the VoIP conversation.

Further, if an employee of the same company listens in to the call, that employee's terminal device may also have the live transcript 604 and the real-time insights 607 displayed.

FIG. 6B relates to a different VoIP conversation between the sales representative 609 and a contact of customer 615 of the company, and insights may concern data security or trade secret of a company. Thus, insights 613 may be displayed on a terminal device of the sales representative 609, but not on a terminal device 604 of the contact of the customer 615. Similarly, if another contact from the customer 615 listens to the call, that contact will also not see the insights 613 on his or her terminal device.

Figure 7:
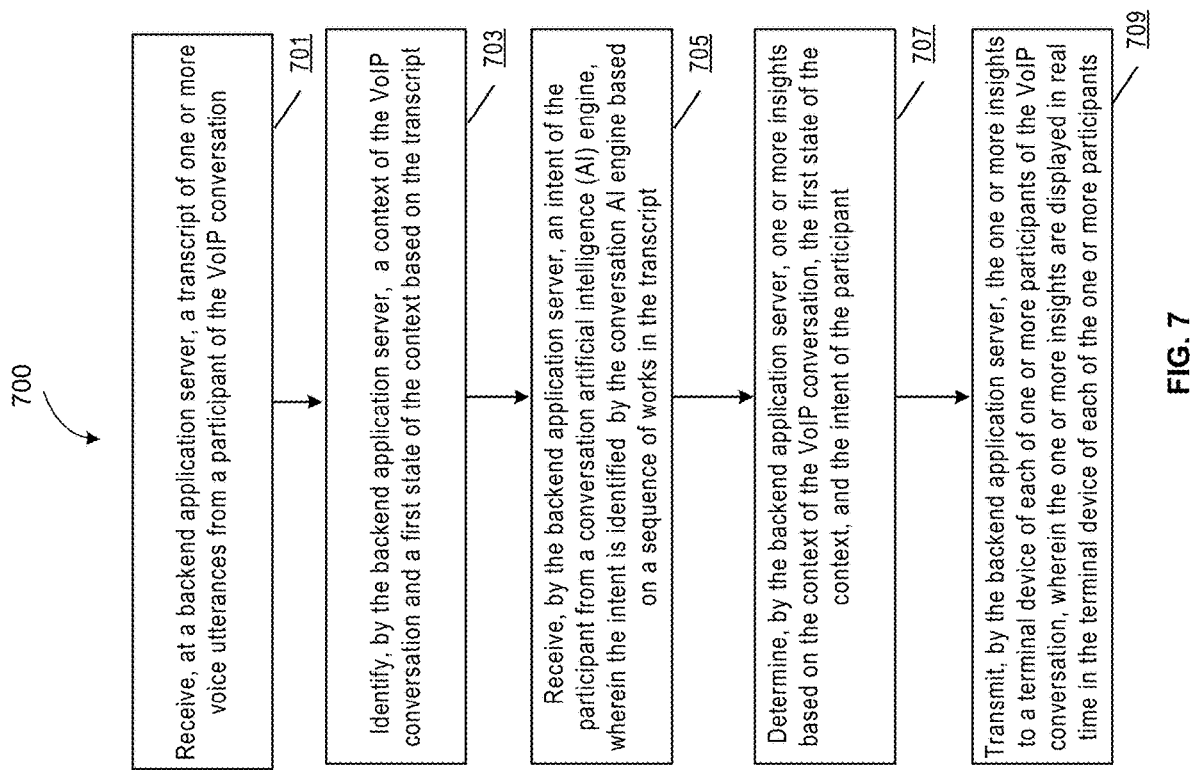
FIG. 7 illustrates a process of generating real-time insights during a VoIP conversation according to an embodiment of the invention.

FIG. 7 illustrates a process 700 of generating real-time insights during a VoIP conversation according to an embodiment of the invention. The process 700 can be performed by processing logic that includes software, hardware, or a combination thereof. For example, the processing logic may be performed by the backend application server 105 and/or one or more other components in the cloud environment 101 as described in FIG. 1.

The process 700 enables real-time insights to be generated and to be displayed in a terminal alongside a transcript of the VoIP conversation. The insights can function as cues to remind a participant of proper things to say in response to a question from another participant in the VoIP conversation, or provide additional information regarding a particular matter raised in the VoIP conversation.

Referring to FIG. 7, in operation 701, the processing logic receives a transcript of one or more voice utterances of a participant in the VoIP conversation. In operation 703, the processing logic identifies a context of the VOIP conversation and a first state of the context based on the transcript. In operation 705, the processing logic receives an intent of the participant from a conversation artificial intelligence (AI) engine, wherein the intent is identified by the conversation AI engine based on a sequence of words in the transcript. In operation 707, the processing logic determines one or more insights based on the context of the VoIP conversation, the first state of the context, and the intent of the participant. In operation 709, the processing logic transmits the one or more insights to a terminal device of each of one or more participants of the VoIP conversation, wherein the one or more insights are displayed in real time in the terminal device of each of the one or more participants.

In an embodiment, the insights are not displayed to an external participant in the VoIP conversation for security and privacy reasons.

Figure 8:
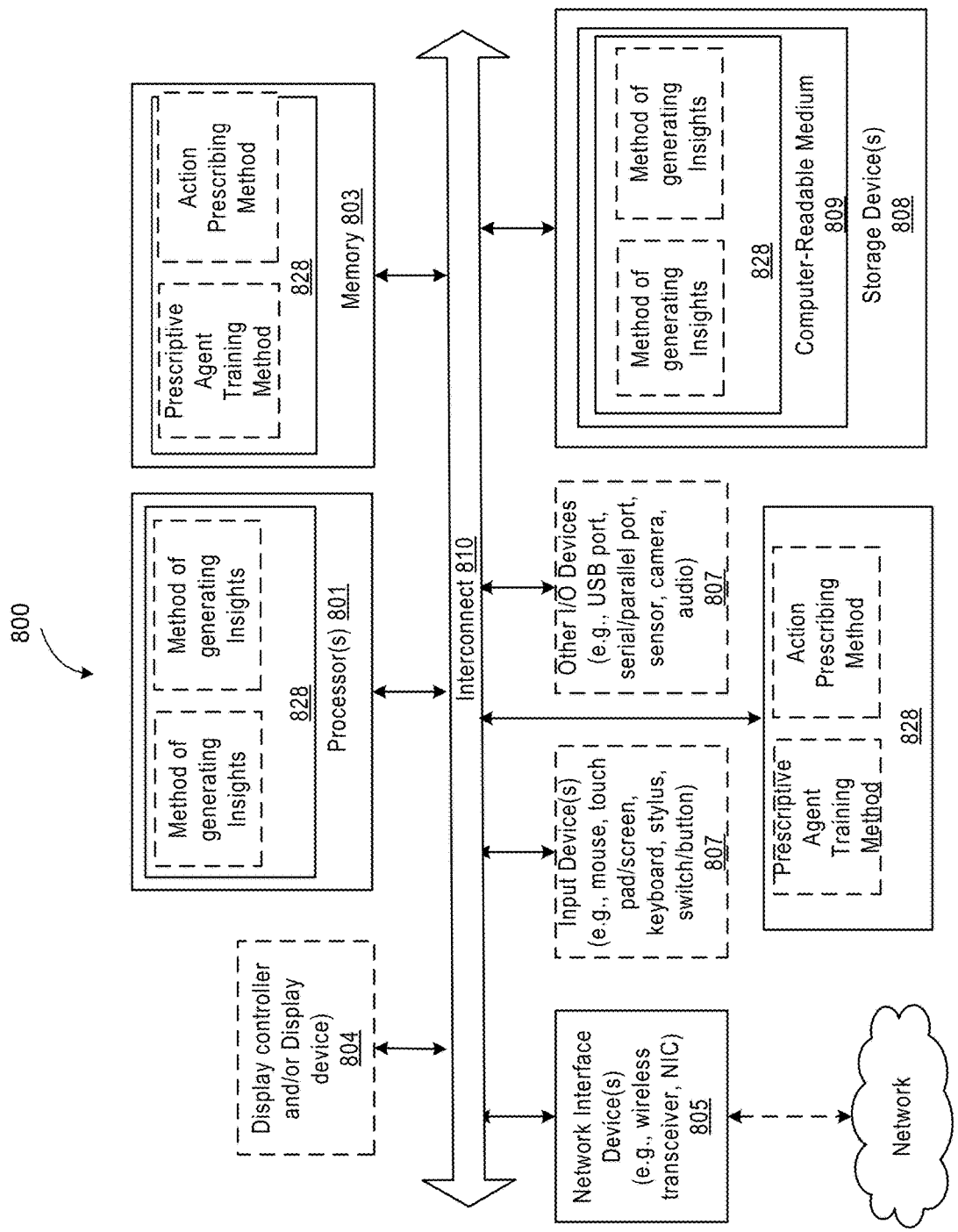
FIG. 8 is a block diagram illustrating an example of a data processing system which may be used with any embodiment of the invention.

FIG. 8 is a block diagram illustrating an example of a data processing system 800 which may be used with any embodiment of the invention. For example, system 800 may represent any of data processing systems described above, such as data analytics system 104, task database system 105, or activity database system 106, etc., performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

System 800 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

For one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, optional input device(s) 807, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 807 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, for other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may also be coupled to processor 801, e.g., via a serial peripheral interface (SPI). This flash device may provide for non-volatile storage of system software, including a BIOS as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may represent any of the components described above. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of generating real-time insights during a voice over internet protocol (VOIP) conversation, comprising:
   receiving, at a backend application server, a transcript of one or more voice utterances of a participant in the VoIP conversation;
   identifying, by the backend application server, a context of the VoIP conversation and a first state of the context based on the transcript;

receiving, by the backend application server, an intent of the participant from a conversation artificial intelligence (AI) engine, wherein the intent is identified by the conversation AI engine based on a sequence of words in the transcript;

determining, by the backend application server, one or more insights based on the context of the VoIP conversation, the first state of the context, and the intent of the participant;

transmitting, by the backend application server, the one or more insights to a terminal device of each of one or more participants of the VOIP conversation, wherein the one or more insights are displayed in real time in the terminal device of each of the one or more participants, and wherein each of the one or more participants is a participant with one or more predetermined attributes and at least one participant has one or more predetermined attributes that the one or more participants do not have.

2. The computer-implemented method of claim 1, wherein the one or more insights are not displayed on a terminal device of at least one participant in the VoIP conversation.

3. The computer-implemented method of claim 1, wherein the context of the VOIP conversation is a data object that defines one or more of the following properties: participants of the VoIP conversation, a time period that the VoIP conversation relates to, whether the participants include an external party, contact information of the external party, activities between the participants, whether a competitor is mentioned, or deal information among the participants.

4. The computer-implemented method of claim 3, wherein one or more additional properties are added to the data object based on the one or more voice utterances.

5. The computer-implemented method of claim 4, wherein the first state of the context is changed to a second state when each of the one or more additional properties is added to the data object or when a value of an existing property changes.

6. The computer-implemented method of claim 5, wherein the context of the VOIP conversation, a unique identifier of the VOIP conversation, and the first state and the second state of the context of the VOIP conversation are stored in a cache in a cloud environment, wherein the cache further includes a state machine that keeps tracks of each state of the context during the VOIP conversation.

7. The computer-implemented method of claim 6, wherein the intent generated by the conversation AI engine is further refined based on the state machine.

8. The computer-implemented method of claim 5, wherein the backend application server formulates one or more queries to retrieve the one or more insights from one or more backend databases in a cloud environment.

9. The computer-implemented method of claim 8, wherein the one or more backend databases include a task database and a conversation database, wherein the task database includes information related to a plurality of tasks, and wherein the conversation database includes a plurality of entries, each entry mapping an insight to a combination of a context, a state of the context, and the intent.

10. A data processing system, comprising:
a processor; and
a memory coupled to the processor to store instructions therein for generating real-time insights during a voice over internet protocol (VOIP) conversation, which when executed by the processor, cause the processor to perform operations, the operations comprising:
receiving a transcript of one or more voice utterances of a participant in the VoIP conversation;
identifying a context of the VOIP conversation and a first state of the context based on the transcript;
receiving an intent of the participant from a conversation artificial intelligence (AI) engine, wherein the intent is identified by the conversation AI engine based on a sequence of words in the transcript;
determining one or more insights based on the context of the VOIP conversation, the first state of the context, and the intent of the participant;
transmitting the one or more insights to a terminal device of each of one or more participants of the VOIP conversation, wherein the one or more insights are displayed in real time in the terminal device of each of the one or more participants, and wherein each of the one or more participants is a participant with one or more predetermined attributes and at least one participant has one or more predetermined attributes that the one or more participants do not have.

11. The data processing system of claim 10, wherein the one or more insights are not displayed on a terminal device of at least one participant in the VoIP conversation.

12. The data processing system of claim 10, wherein the context of the VoIP conversation is a data object that defines one or more of the following properties: participants of the VoIP conversation, a time period that the VOIP conversation relates to, whether the participants include an external party, contact information of the external party, activities between the participants, whether a competitor is mentioned, or deal information among the participants.

13. The data processing system of claim 12, wherein one or more additional properties are added to the data object based on the one or more voice utterances.

14. The data processing system of claim 13, wherein the first state of the context is changed to a second state when each of the one or more additional properties is added to the data object or when a value of an existing property changes.

15. The data processing system of claim 14, wherein the context of the VoIP conversation, a unique identifier of the VoIP conversation, and the first state and the second state of the context of the VoIP conversation are stored in a cache in a cloud environment, wherein the cache further includes a state machine that keeps tracks of each state of the context during the VoIP conversation.

16. The data processing system of claim 15, wherein the intent generated by the conversation AI engine is further refined based on the state machine.

17. The data processing system of claim 14, wherein a backend application server formulates one or more queries to retrieve the one or more insights from one or more backend databases in a cloud environment.

18. A non-transitory computer-readable medium that stores instructions for generating real-time insights during a voice over internet protocol (VOIP) conversation, which instructions, when executed by a data processing system comprising at least one hardware processor, cause the data processing system to perform operation comprising:
receiving a transcript of one or more voice utterances of a participant in the VoIP conversation;
identifying a context of the VOIP conversation and a first state of the context based on the transcript;
receiving an intent of the participant from a conversation artificial intelligence (AI) engine, wherein the intent is identified by the conversation AI engine based on a sequence of words in the transcript;

determining one or more insights based on the context of the VOIP conversation, the first state of the context, and the intent of the participant;

transmitting the one or more insights to a terminal device of each of one or more participants of the VOIP conversation, wherein the one or more insights are displayed in real time in the terminal device of each of the one or more participants, and wherein each of the one or more participants is a participant with one or more predetermined attributes and at least one participant has one or more predetermined attributes that the one or more participants do not have.

19. The non-transitory computer-readable medium 18, wherein the one or more insights are not displayed on a terminal device of at least one participant in the VoIP conversation.

20. The non-transitory computer-readable medium 18, wherein the context of the VOIP conversation is a data object that defines one or more of the following properties: participants of the VOIP conversation, a time period that the VoIP conversation relates to, whether the participants include an external party, contact information of the external party, activities between the participants, whether a competitor is mentioned, or deal information among the participants.

* * * * *